US007774470B1

(12) United States Patent
Sanders et al.

(10) Patent No.: US 7,774,470 B1
(45) Date of Patent: Aug. 10, 2010

(54) LOAD BALANCING USING A DISTRIBUTED HASH

(75) Inventors: Darren M. Sanders, Santa Clarita, CA (US); Carey S. Nachenberg, Northridge, CA (US); Kent E. Griffin, Santa Monica, CA (US)

(73) Assignee: Symantec Corporation, Cupertino, CA (US)

( * ) Notice: Subject to any disclaimer, the term of this patent is extended or adjusted under 35 U.S.C. 154(b) by 387 days.

(21) Appl. No.: 11/692,484

(22) Filed: Mar. 28, 2007

(51) Int. Cl.
*G06F 13/00* (2006.01)
(52) U.S. Cl. .................. 709/226; 709/219; 709/229; 718/105
(58) Field of Classification Search ............ 709/217, 709/219, 223, 224, 225, 226, 227, 229
See application file for complete search history.

(56) References Cited

U.S. PATENT DOCUMENTS

| | | | | |
|---|---|---|---|---|
| 6,330,606 B1* | 12/2001 | Logue et al. | ............... | 709/226 |
| 6,430,618 B1* | 8/2002 | Karger et al. | ............... | 709/225 |
| 6,823,377 B1* | 11/2004 | Wu et al. | ............... | 709/223 |
| 7,281,245 B2* | 10/2007 | Reynar et al. | ............... | 717/173 |
| 2003/0191822 A1* | 10/2003 | Leighton et al. | ............... | 709/219 |
| 2006/0064478 A1* | 3/2006 | Sirkin | ............... | 709/223 |
| 2008/0177741 A1* | 7/2008 | Joshi et al. | ............... | 707/8 |

OTHER PUBLICATIONS

Aron, Mohit, et al., "Scalable Content-Aware Request Distribution in Cluster-Based Network Servers", Jun. 2000, 15 pages, Department of Computer Science, Rice University, Houston, TX.
Pai, Vivek S., et al., "Locality-Aware Request Distribution in Cluster-Based Network Servers", 1998, pp. 205-216, Department of Electrical and Computer Engineering, Rice University.

\* cited by examiner

*Primary Examiner*—Viet Vu
(74) *Attorney, Agent, or Firm*—Fenwick & West LLP

(57) ABSTRACT

A load balancing server system includes a plurality of servers. A server has a dispatcher module, a request handler module, a cache and a local database. A load balancer receives requests for information from clients and distributes the requests among dispatcher modules of the plurality of servers in a balanced manner. The dispatcher module receives a request for information, calculates an identifier of a server from a subset of a hash result responsive to the request, routes the request to the server identified by the identifier, and provides information in the response to the client that requested it. The request handler module receives the request routed by the dispatcher module, determines the requested information by searching the cache and/or the local database, and provides the determined information to the dispatcher module.

20 Claims, 4 Drawing Sheets

LOAD BALANCING USING A DISTRIBUTED HASH

BACKGROUND

1. Field of the Invention

This invention pertains in general to serving data over a computer network, and in particular to load balancing across a set of servers providing data in response to client requests.

2. Description of the Related Art

The Internet can be a dangerous place. Many web sites on the Internet are malicious. Some sites surreptitiously provide viruses, Trojan horse programs, and other malicious software (malware). Other sites mimic the site of a legitimate organization, such as bank, in an attempt to capture confidential information through "phishing" attacks.

Users often run security software on their web-browsing clients in order to protect themselves from dangerous web sites. Some security software identifies a site that a user is visiting, and provides a visual cue or other notification indicating whether the site is dangerous. Typically, the security software must query a remote server on the Internet in order to determine whether a particular site is dangerous. There are simply too many web sites to store this information on the client.

The provider of the security software, in turn, must maintain a service for responding to the queries from the clients. Providing enough computing power to meet the demand of the clients is challenging. A set of servers providing the service might receive 50,000 requests per second. These requests must be handled quickly (e.g., within a second), in order to avoid impacting the user's web browsing experience. Moreover, the servers should be highly-available and fault tolerant so that the failure of any particular server component will not significantly impact the service. Additionally, the servers should be scalable in order to meet increases in demand.

Accordingly, there is a need in the art for a way to provide a service that meets the requirements outlined above.

BRIEF SUMMARY OF THE INVENTION

The above and other needs are met by a method, system, and computer program product that receives requests for information from clients and provides the information in response in a load balanced manner. Embodiments of the load balancing method include receiving a request for information from a client, calculating an identifier of a server of a plurality of servers responsive to a subset of a hash result generated responsive to the request, routing the request to the server identified by the identifier, determining the information requested by the request, and providing the information determined in response to the request to the client. Embodiments of the load balancing system include a plurality of servers, at least one dispatcher module and one request handler module executed by a server of the plurality of servers. The dispatcher module receives a request for information from a client, calculates an identifier of a server responsive to a subset of a hash result generated responsive to the request, routes the request to the server identified by the identifier, and provides information determined in response to the request to the client. The request handler module receives the request routed by the dispatcher module, determines the information requested, and provides the determined information to the dispatcher module. Embodiments of the load balancing computer program product include a dispatcher module for receiving a request for information from a client, calculating an identifier of a server of a plurality of servers responsive to a subset of a hash result generated responsive to the request, routing the request to the server identified by the identifier, and providing information determined in response to the request to the client. Embodiments of the load balancing computer program product further include a request handler module for receiving a request routed by a dispatcher module, determining the information requested by the request, and providing the determined information to the dispatcher module.

The figures depict an embodiment for purposes of illustration only. One skilled in the art will readily recognize from the following description that alternative embodiments of the structures and methods illustrated herein may be employed without departing from the principles described herein.

DETAILED DESCRIPTION OF THE PREFERRED EMBODIMENTS

Figure 1:
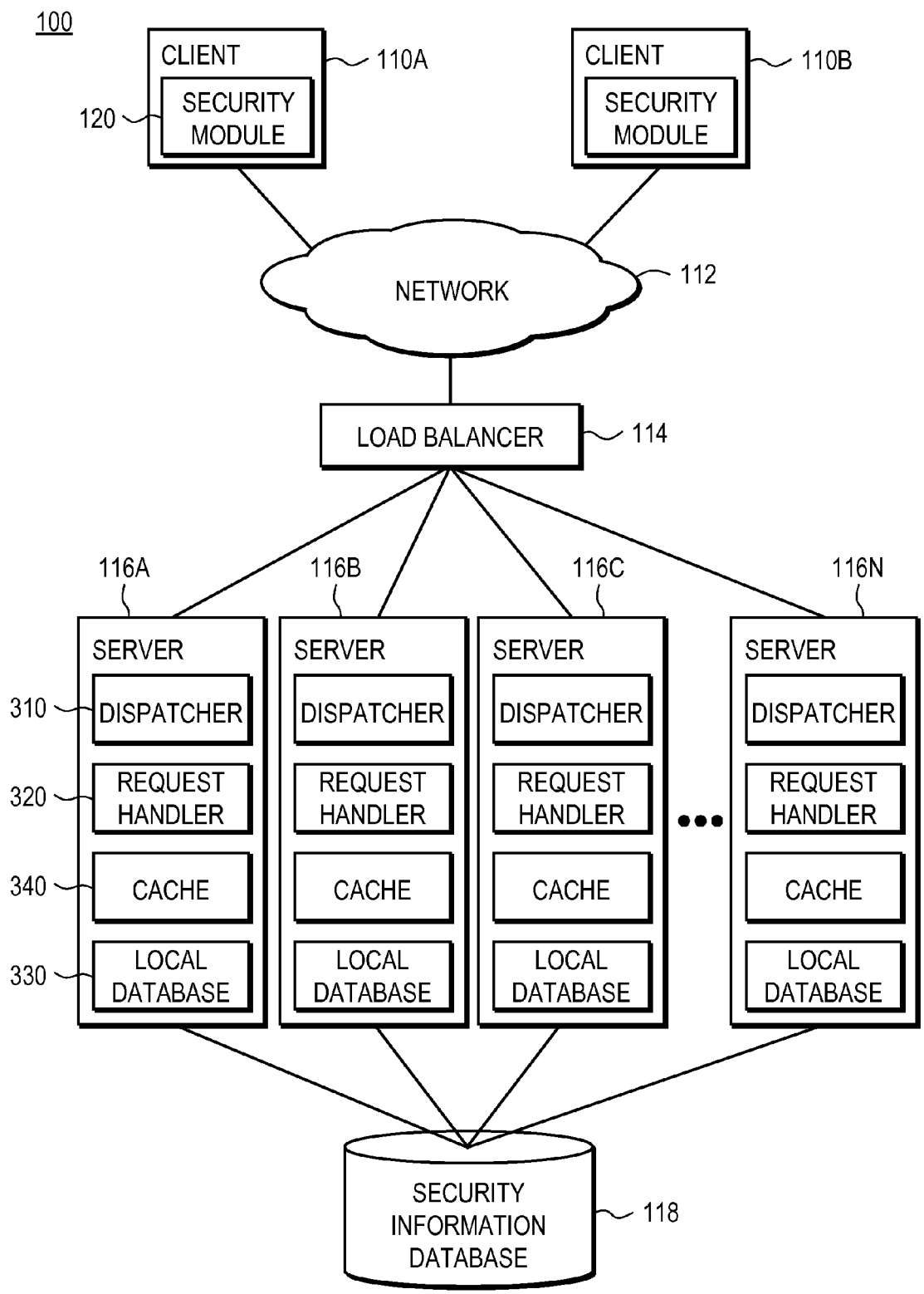
FIG. 1 is a high-level diagram illustrating an environment having a load balanced server system according to one embodiment.

FIG. 1 is a high-level diagram illustrating an environment having a load balanced server system 100 that provides data in response to client requests according to one embodiment. The environment comprises one or more clients 110 connected to the load balanced server system 100 via a computer network 112.

A client 110 communicates with the load balanced server system 100 through the computer network 112. The client 110 can be a personal computer (PC) in one embodiment, or a mobile handset or other electronic computing devices in other embodiments. Only two clients are included in FIG. 1 in order to simplify the figure. There can be thousands or millions of clients 110 using the load balanced server system 100 in some embodiments.

In one embodiment, the client 110 contains a security module 120. The security module 120 generates requests to the load balanced server system 100, and receives messages in response. In one embodiment, the security module 120 monitors web browsing activities on the client 110 to identify universal resource locators (URLs) of web sites and/or other network locations accessed by the client 110, normalizes the URLs by stripping off data such as personal information embedded in the URLs, and provides the URL and/or related information to the load balanced server system 100. The security module 120 receives security information from the load balanced server system 100 in return and presents the information to the client 110 in conjunction with the web browsing, thus allowing the client 110 to evaluate security risks associated with the web sites. The security module 120 can send and/or receive other types of data in other embodiments. The security module 120 can be a stand alone application, or integrated into operating system, web browser, or other software modules.

The network 112 enables communications between the clients 110 and the load balanced server system 100. In one embodiment, the network 112 uses standard communications technologies and/or protocols. Thus, the network 112 can include links using technologies such as Ethernet, 802.11, integrated services digital network (ISDN), digital subscriber line (DSL), asynchronous transfer mode (ATM), etc. Similarly, the networking protocols used on the network 112 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 112 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs) or Internet Protocol security (IPsec). In another embodiment, the entities can use custom and/or dedicated data communications technologies instead of, or in addition to, the ones described above.

In one embodiment, the load balanced server system 100 receives a request containing at least one URL from a client 110, determines security information about the web site identified by the URL, and replies with the message containing security information about the web site. The security information can include, for example, an overall security score, a reputation score, and/or other data describing the potential risks presented by the site.

An embodiment of the load balanced server system 100 includes a load balancer 114 connected to multiple servers 116. At least one of the servers 116 is connected to a security information database 118. The load balancer 114 receives requests from the security modules 120 in the clients 110, and distributes the requests among the servers 116. In one embodiment, the load balancer 114 routes the requests to the servers 116 using a round robin routing algorithm.

Each server 116 includes a dispatcher module 310, a request handler module 320, a local database 330 and a cache 340 in one embodiment. The dispatcher 310 receives the request from the load balancer 114 and dispatches the request to the request handler modules 320 of the one or more servers 116 that will process it. In one embodiment, the request handler 320 receives a request with a URL, and retrieves the security information for the web site identified by the URL. If the security information is available in the cache 340, the request handler 320 obtains it from there. Otherwise, the request handler 320 retrieves the security information from the local database 330, caches the information in the cache 340, and sends it back to the dispatcher 310. Finally, the dispatcher 310 replies to the client 110 with the requested security information.

The security information database 118 stores security information about web sites on the network 112. The security information describes the risks associated with the web sites. The security information is based on information such as the operator of a site, the amount of malware detected on the site, the amount of traffic received by the site, etc. In one embodiment, the security information is generated by crawling the World Wide Web and analyzing web sites found during the crawl. Other embodiments generate the security information using other techniques.

Figure 2:
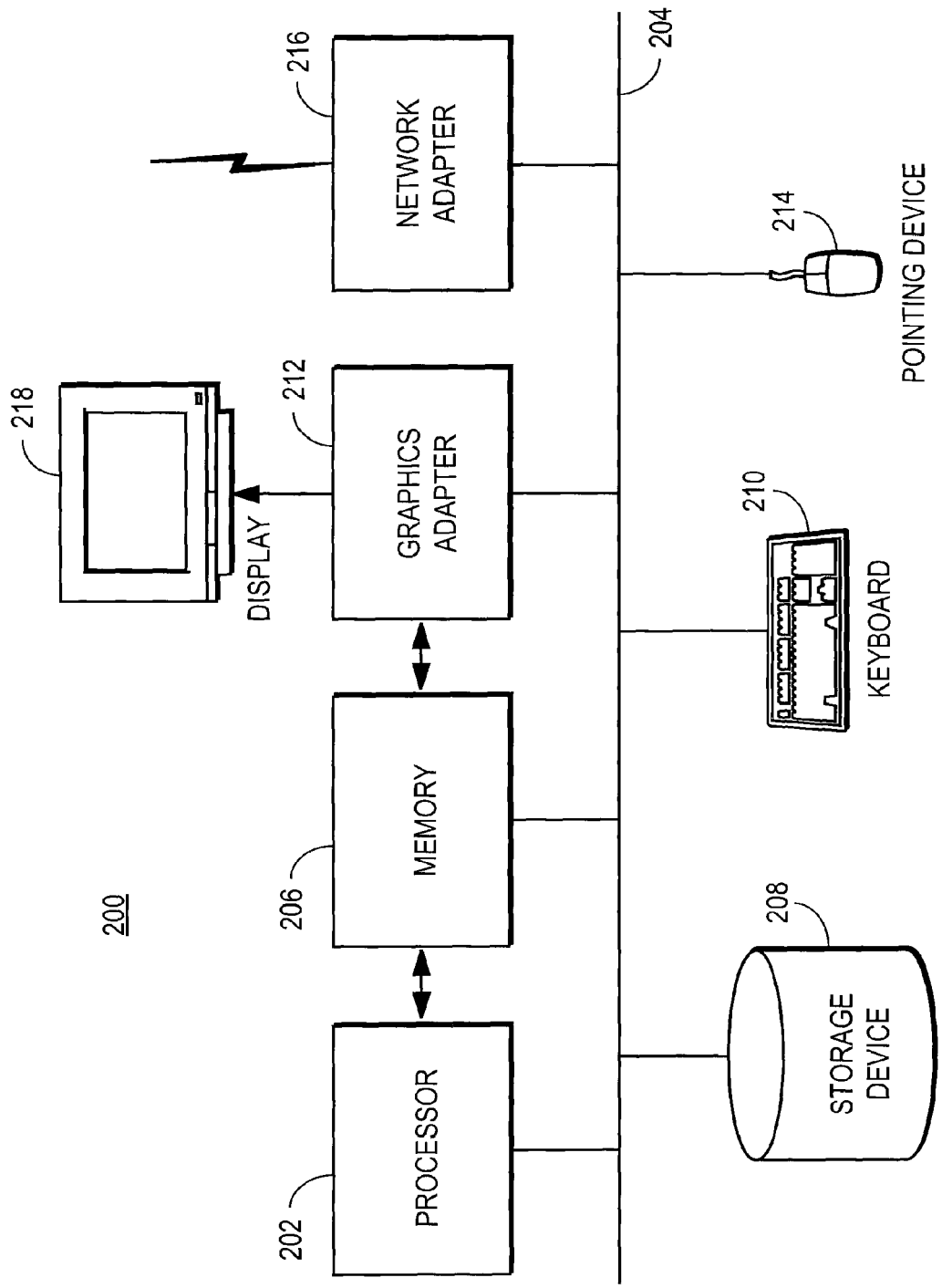
FIG. 2 is a high-level block diagram of a computer for acting as a client, a server, a load balancer and/or a manager of a security information database according to one embodiment.

FIG. 2 is a high-level block diagram of a computer 200 for acting as a client 110, a server 116, a load balancer 114, and/or a manager of the security information database 118 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. In one embodiment, the functionality of the bus 204 is provided by an interconnecting chipset. A display 218 is coupled to the graphics adapter 212.

The storage device 208 is any device capable of holding data, like a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to a local or wide area network.

As is known in the art, a computer 200 can have different and/or other components than those shown in FIG. 2. In addition, the computer 200 can lack certain illustrated components. For example, a computer 200 acting as a server 116 can lack a keyboard 210, pointing device 214, graphics adapter 212, and/or display 218. Moreover, the storage device 208 can be local and/or remote from the computer 200 (such as embodied within a storage area network (SAN)).

Figure 3:
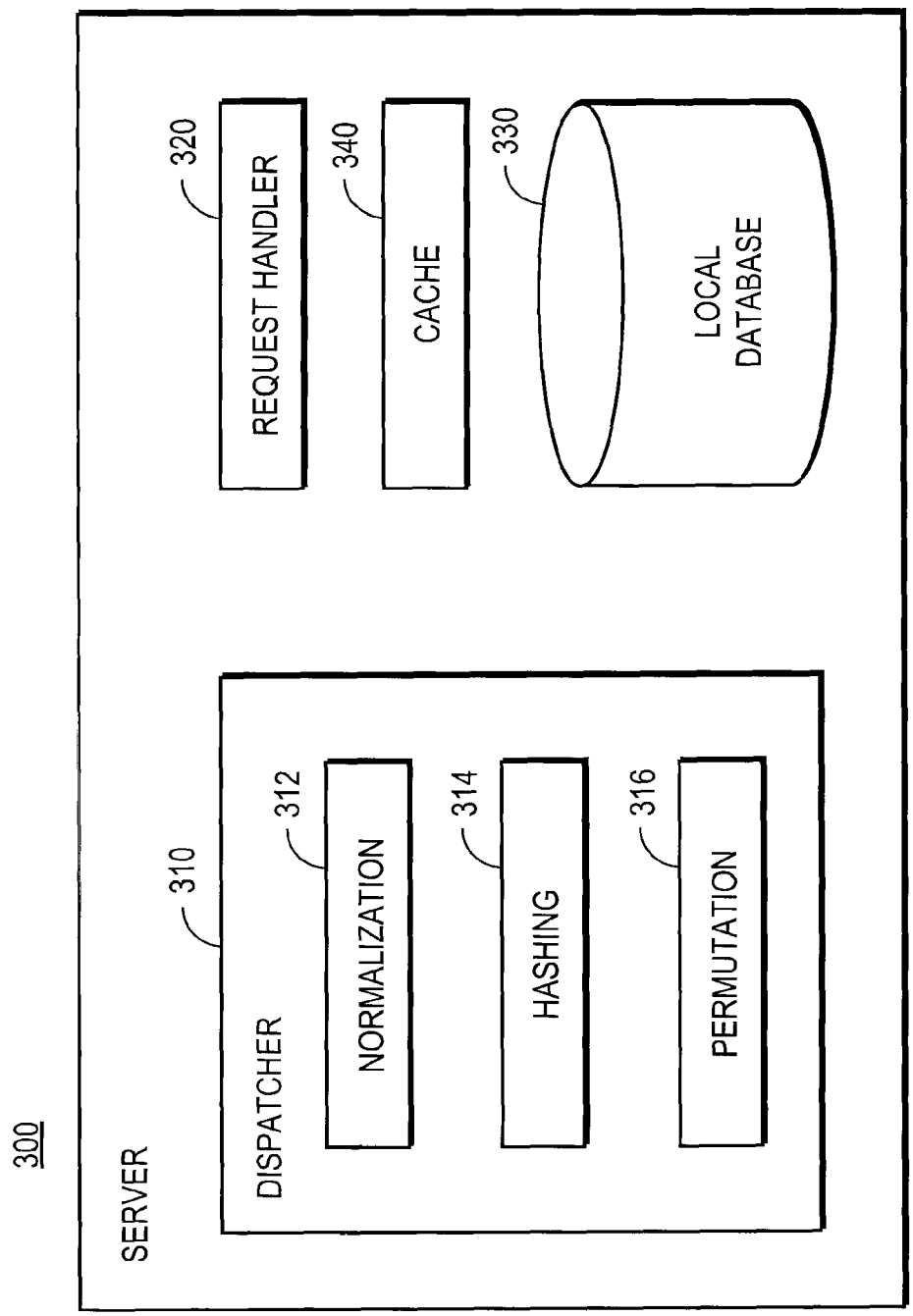
FIG. 3 is a high-level block diagram illustrating modules within a server of a load balanced server system according to one embodiment.

FIG. 3 is a high-level block diagram illustrating modules within a server 116 of the load balanced server system 100 according to one embodiment. In one embodiment, each server 116 of the system 100 is functionally identical, except for the differences described below. Thus, the server 116 of FIG. 3 represents any of the servers in the system.

Further, in one embodiment the load balanced server system 100 is configured to have a specified maximum number of servers. The maximum number can be any number, but is usually a power of two for computational efficiency. In one embodiment, there is a maximum of 32 servers 116 in the system. Each server 116 in the system 100 is assigned a number between 0 and the maximum-1 that functions as the identifier for the server. The numbers assigned to the servers need not be consecutive, and the logical server space can be sparsely populated. For example, even though there is a maximum of 32 servers in one embodiment, there can in fact be five active servers at a given instant, with the servers identified by numbers 3, 6, 9, 14, and 31. Servers 116 can be removed or added to the system 100 at any time. Thus, a slot represented by a given identifier (e.g., the slot for server 3) can be active or inactive at given instants in time.

As shown in FIG. 1, an embodiment of a server 116 includes a dispatcher module 310, a request handler module 320, a local database 330 and a cache 340. Other embodiments can have different and/or additional modules than the ones shown in the figure. In addition, the functions can be distributed among the modules in a different manner than is described here.

The dispatcher module 310 receives request from the load balancer 114, identifies the server 116 that will process it, dispatches the request to the request handler module 320 of the identified server 116, receives a response containing security information from the request handler module 320, and replies to the client 110 with the requested security information. Each request from a client 110 contains one or more URLs. In one embodiment, the dispatcher 310 dispatches each URL in a request separately. Thus, separate URLs in a single request can be dispatched to different servers 116. The dispatcher 310 collects the responses from the multiple servers 116 processing a given request, and replies to the client 110 with security information for each of the URLs contained in the request. Since an embodiment of the dispatcher 310 processes requests containing single URLs in substantially the same manner as requests containing multiple URLs, the remainder of this description assumes that the request contains only a single URL.

In one embodiment, the dispatcher module 310 includes a normalization module 312, a hashing module 314 and a permutation module 316. The normalization module 312 normalizes the request received by the dispatcher module 310. In one embodiment, the normalization is realized by converting the URL to a normalized form so that equivalent URLs from different requests are hashed to the same hash result by the hashing module 314. In addition, the normalization may include other processing of the URL, such as extracting just the domain name from the URL. In some embodiments, normalization is also performed to filter the requests. This filtering can remove requests sent by malicious attackers and/or unauthorized clients.

The hashing module 314 within the dispatcher module 310 performs a hashing algorithm on the normalized URL of a request to generate a hash result. In one embodiment, an MD5 hash is computed on the normalized URL to produce a hash. However, any hashing algorithm can be used as long as it produces enough bytes in the hash result to support the maximum number of possible servers 116 in the load balanced server system 100. For example, the hashing module 314 can use a SHA1 hash, a pair of CRC64 hashes, or a CRC128 hash in other embodiments.

The permutation module 316 generates an ordered set of numbers based on subsets of the hash result produced by the hashing module 314. In an embodiment where the load balanced server system 100 supports a maximum of N servers, the permutation module 316 generates a uniform random permutation of N numbers within the range 0 to N−1. Each number indexes (identifies) a slot in the 0 to N−1 server space that might contain an active server.

In one embodiment, the permutation module 316 generates a first index for a server 116 from a first subset of the hash result. If there is not an active server at that index, the permutation module 316 generates a second index. This process continues until an index having a corresponding active server is generated. Generating indices in this incremental fashion minimizes processing demands by minimizing the number of calculations performed by the permutation module 316. Other embodiments use different techniques, such as generating the entire ordered set of indices at once. In one embodiment, the dispatcher module 310 maintains an open connection with the request handler 320 of each server 116 in the load balanced server system 100, including the request handler 320 of its own server 116. This allows the dispatcher module 310 to quickly determine whether a server 116 corresponding to an index produced by the permutation module 316 is active.

To understand how the hashing module 314 and the permutation module 316 cooperate to identify a server 116 to handle a request, let N be the maximum possible number of servers 116 in the load balanced server system 100. For the purpose of illustration, assume that N equals 32. The hashing module 314 generates an MD5 hash of a normalized URL and produces a 16-byte hash result. Next, N−1 consecutive blocks of 16 bits each are extracted from the 16-byte hash result to seed the creation of the permutation by shifting a certain number of bits for each block. In one embodiment, these N−1 consecutive blocks are obtained by shifting to the right 3 bits of the hash result for each new block of 16 bits. For example, the first block is obtained by extracting bits 0 to 15 from the hash result, then bits 3 to 18 for block 2, bits 6 to 12 for block 3, and so on in an overlapping fashion.

Then, these 16-bit blocks are used to determine the server indices. In one embodiment, an ordered list of server indices for the N servers is created. A first server value is generated by computing the modulo of the first 16-bit block with N. This value is used as an index into the ordered list, and the resulting server index identifies the first server to try. If this server is active, it is used to handle the request. If the server is inactive, then the corresponding server index is removed from the list. The list now contains N−1 server indices. A second server value is generated by computing the modulo of the second 16-bit block with N−1, and this value is again used as an index into the list. Subsequent server values are computed by the same procedure until an active server is found. This process thus generates a uniform random permutation of N numbers within the range 0 to N−1, inclusive.

To illustrate the use of the server values and indices described above, let N=4 and let the list be initialized with the four server indices in order: (0, 1, 2, 3). Suppose that the first 16-bit block contains the value 6. The first server value of 6 modulo 4=2, and the server index at the third position in the list is selected (because the numbering starts from zero). Thus, server index 2 is selected. Now, suppose that server 2 is inactive. Server index 2 is removed from the list, so that the list now contains (0, 1, 3). Assume that the next 16-bit block contains the value 13. The second server value of 13 modulo 3=1, and the server index at the second position in the list is selected (server index 1). If the server referenced by index 1 is active, then it is used to process the request. Otherwise, the process continues until an active server is found.

With the ordered set of server indices generated by the hashing module 314 and the permutation module 316, the dispatcher module 310 is able to efficiently dispatch a request to an active server 116. Moreover, the requests are consistently dispatched so that requests related to the same URL are sent to the same server 116. In one embodiment, upon receiving a request from the load balancer 114, the dispatcher module 312 calculates the first index and dispatches the request to the request handler 320 of the identified server 116 if it is active. If the identified server 116 is not active, the dispatcher module 310 calculates additional server indices until an index of an active server is found.

In one embodiment, the local database 330 within a server 116 contains a subset of the information in the security information database 118. It contains information needed to answer the requests, such as a security score for a web site identified by a URL, and does not necessarily include other information like the data on which the security score is based. In one embodiment, the local database 330 in one of the servers 116 acts as a master database, and all of the other server databases are replicated from the master database.

The cache 340 within a server 116 caches the security information for the requests. In one embodiment, the cache 340 is maintained using a least-recently-used (LRU) algorithm so that most recently requested data are cached, and least recently requested data are purged. Generally, data retrieval from the cache 340 is faster than from the local database 330.

The request handler module 320 within a server 116 receives a request sent from a dispatcher 310, retrieves the requested information for the request, and replies back to the dispatcher 310 with the requested information. Upon receiving a request, the request handler module 320 first checks to determine whether the requested information is available in the cache 340. If not, it accesses its local database 330 to get the result and caches the result in the cache 340.

Figure 4:
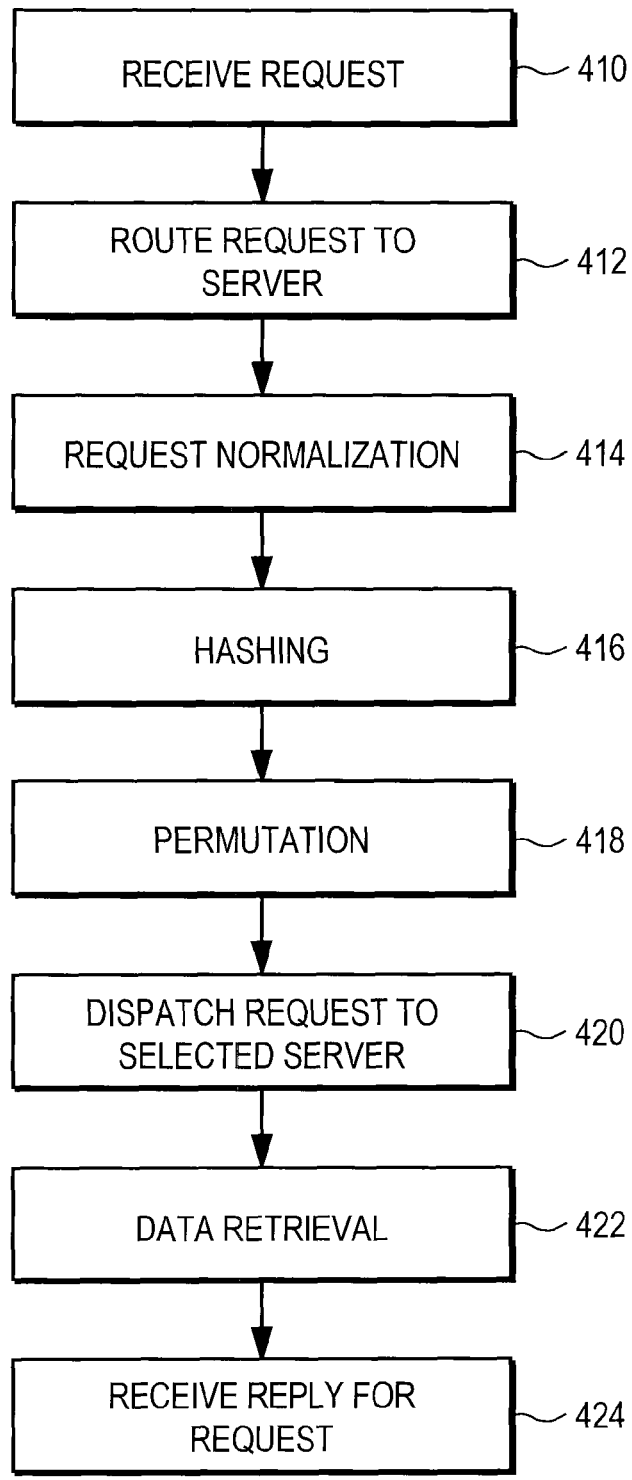
FIG. 4 is a flowchart showing a method of using a load balanced server system according to one embodiment.

FIG. 4 is a flowchart showing a method of using the balanced server system 100 according to one embodiment. Other embodiments perform different and/or additional steps than the ones described here. Moreover, other embodiments perform the steps in different orders. A typical embodiment of the load balanced server system 100 processes a large volume of requests concurrently. Thus, the load balanced server system 100 simultaneously performs multiple instances of the steps described here.

Initially, the load balancer 114 receives 410 a request from the security module 120 of a client 110. The load balancer 114 routes 412 the request to one of the servers 116 in the system. Upon receiving the request from the load balancer 114, the dispatcher 310 of the server 116 normalizes 414 the request. The dispatcher 310 further hashes 416 and computes one or more permutations 418 on the request in order to identify an active server. Then, the dispatcher 310 dispatches 420 the request to the server 116. The request handler module 320 of the server to which the request was dispatched retrieves 422 the requested security information from the cache 340 and/or the local database 330 and replies to the dispatcher 310. Finally, the client 110 receives 424 the requested security information from the dispatcher 310.

The load balanced server system 100 thus balances load across a set of servers providing data in response to client requests with high performance and fault tolerance. Requests for security information associated with particular URLs are routed to the same servers 116 and therefore the information responsive to the request is likely to already be cached by the server 116. The system 100 thus maximizes cache efficiency. Further, an individual server 116 can fail at any time without adversely impacting system performance. If a server 116 fails, its role is immediately assumed by the next active server 116 indexed through the permutation based on the URL. Likewise, servers 116 can be added to the system and immediately share the processing load of the system. While allowing individual servers 116 to fail or to be added to the load balanced server system 100 at any time without incurring communication penalties between servers 116, no central server or database is required to store the active set of servers 116 for the load balanced server system 100.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A load balancing system for receiving requests for information from clients and providing the information in response, the system comprising:
 a plurality of servers, each server identified by an identifier;
 at least one dispatcher module executed by a server of the plurality of servers, the dispatcher module adapted to receive a request for information from a client, incrementally calculate an identifier of an active server of the plurality of servers responsive to different subsets of a same hash result generated by a hashing module responsive to the request, route the request to the server identified by the identifier, and provide information determined in response to the request to the client; and
 at least one request handler module executed by a server of the plurality of servers, the request handler module adapted to receive the request routed by the dispatcher module, determine the information requested by the request, and provide the determined information to the dispatcher module.

2. The system of claim 1, wherein the request for information includes a normalized uniform resource locator (URL) identifying a web site and wherein the dispatcher module calculates the identifier of the active server responsive to the normalized URL.

3. The system of claim 2, wherein the hashing module is adapted to generate the hash result responsive to the normalized URL and the dispatcher module further comprises:
 a permutation module for generating the identifier of the active server responsive to the different subsets of the same hash result.

4. The system of claim 3, wherein there is a maximum of N servers, the server identifiers are integers ranging from 0 to N−1, the server having a particular identifier can be active or inactive, and the permutation module incrementally calculates server identifiers responsive to different subsets of the same hash result until an identifier of an active server is calculated.

5. The system of claim 1, wherein dispatcher modules are executed by multiple ones of the plurality of servers and further comprising:
 a load balancer for receiving the requests for information from the clients and for distributing the requests among the dispatcher modules of the plurality of servers in a balanced manner.

6. The system of claim 1, wherein the server of the plurality of servers includes a cache and an information database, and the request handler module is adapted to obtain the requested information from the cache if the information is cached, and to obtain the requested information from the information database and cache it in the cache if the information is not already cached.

7. The system of claim 1, wherein the request for information includes a uniform resource locator (URL) identifying a web site and wherein the information provided in response to the request includes security information describing risks presented by the web site.

8. The system of claim 1, wherein the dispatcher module and the request handler modules are executed by different servers.

9. A method for load balancing requests for information from clients and providing the information in response, the method comprising:
 receiving a request for information from a client;
 incrementally calculating an identifier of an active server of a plurality of servers responsive to different subsets of a same hash result generated responsive to the request;
 routing the request to the server identified by the identifier;
 determining the information requested by the request; and
 providing the information determined in response to the request to the client.

10. The method of claim 9, wherein the request for information includes a uniform resource locator (URL) identifying a web site, and wherein calculating an identifier of a server further comprises:
 normalizing the URL in the request for information; and
 calculating the identifier of the active server responsive to the normalized URL.

11. The method of claim 10, wherein calculating an identifier of an active server of the plurality of servers responsive to the request further comprises:
 generating the hash result responsive to the normalized URL; and generating the identifier of the active server responsive to the different subsets of the same hash result.

12. The method of claim 11, wherein there is a maximum of N servers, the server identifiers are integers ranging from 0 to N−1, the server having a particular identifier can be active or inactive, and wherein calculating an identifier of an active server further comprises:
  incrementally calculating server identifiers responsive to different subsets of the same hash result until an identifier of an active server is calculated.

13. The method of claim 9, further comprising:
  receiving multiple requests for information from the clients and distributing the requests among the plurality of servers in a balanced manner.

14. The method of claim 9, wherein the server to which the request is routed includes a cache and an information database, and wherein determining the information requested by the request comprises:
  obtaining the requested information from the cache if the information is cached; and
  obtaining the requested information from the information database and caching it in the cache if the information is not already cached.

15. A computer program product having a computer-readable medium having computer program code for receiving requests for information from clients and providing the information in response, comprising:
  a dispatcher module for receiving a request for information from a client, incrementally calculating an identifier of an active server of a plurality of servers responsive to different subsets of a same hash result generated by a hashing module responsive to the request, routing the request to the server identified by the identifier, and providing information determined in response to the request to the client; and
  a request handler module for receiving a request routed by a dispatcher module, determining the information requested by the request, and providing the determined information to the dispatcher module.

16. The computer program product of claim 15, wherein the request for information includes a normalized uniform resource locator (URL) identifying a web site and wherein the dispatcher module calculates the identifier of the active server responsive to the normalized URL.

17. The computer program product of claim 16, wherein the hashing module is adapted to generate the hash result responsive to the normalized URL and the dispatcher module further comprises:
  a permutation module for generating the identifier of the active server responsive to the different subsets of the same hash result.

18. The computer program product of claim 17, wherein there is a maximum of N servers, the server identifiers are integers ranging from 0 to N−1, the server having a particular identifier can be active or inactive, and the permutation module incrementally calculates server identifiers responsive to different subsets of the same hash result until an identifier of an active server is calculated.

19. The computer program product of claim 15, wherein the request handler module is adapted to obtain the requested information from a server cache if the information is cached, and to obtain the requested information from an information database and cache it in the cache if the information is not already cached.

20. The method of claim 9, wherein a given server of the plurality of servers can be active or inactive, and wherein calculating an identifier of an active server comprises:
  calculating a first identifier of a first server of the plurality of servers responsive to a first subset of the same hash result;
  determining whether the first server is active or inactive; and
  responsive to a determination that the first server is inactive, calculating another identifier of another server of the plurality of servers responsive to another subset of the same hash result.

* * * * *